United States Patent
Soares Cerqueira et al.

(10) Patent No.: US 7,658,837 B2
(45) Date of Patent: Feb. 9, 2010

(54) PROCESS AND DEVICE TO OPTIMIZE THE YIELD OF FLUID CATALYTIC CRACKING PRODUCTS

(75) Inventors: Henrique Soares Cerqueira, Rio de Janeiro (BR); Claudia Maria de Lacerda Alvarenga Baptista, Rio de Janeiro (BR); William Richard Gilbert, Rio de Janeiro (BR); Oscar Rene Chamberlain Pravia, Rio de Janeiro (BR)

(73) Assignee: Petroleo Brasileiro S.A.-Petrobras, Rio De Janeiro, RJ (BR)

( * ) Notice: Subject to any disclaimer, the term of this patent is extended or adjusted under 35 U.S.C. 154(b) by 588 days.

(21) Appl. No.: 11/190,863

(22) Filed: Jul. 28, 2005

(65) Prior Publication Data
US 2006/0021909 A1 Feb. 2, 2006

(30) Foreign Application Priority Data
Jul. 30, 2004 (BR) .................................... 0403184

(51) Int. Cl.
*C10G 11/00* (2006.01)
*B01J 8/18* (2006.01)

(52) U.S. Cl. .................. 208/113; 208/78; 208/148; 208/151; 208/153; 208/155; 208/163; 208/164; 422/139; 422/144

(58) Field of Classification Search ............ 208/78, 208/113, 148, 151, 153, 155, 163, 164; 422/139, 422/144
See application file for complete search history.

(56) References Cited

U.S. PATENT DOCUMENTS

| | | | |
|---|---|---|---|
| 5,154,818 A | | 10/1992 | Harandi et al. |
| 5,176,815 A | * | 1/1993 | Lomas ........................ 208/78 |
| 5,234,578 A | | 8/1993 | Stine et al. |
| 5,310,477 A | * | 5/1994 | Lomas ........................ 208/78 |
| 5,616,237 A | | 4/1997 | Krishna et al. |
| 6,162,402 A | | 12/2000 | Lomas |
| 6,238,548 B1 | | 5/2001 | Upson et al. |

* cited by examiner

*Primary Examiner*—In Suk Bullock
*Assistant Examiner*—Prem C. Singh
(74) *Attorney, Agent, or Firm*—Sughrue Mion, PLLC

(57) ABSTRACT

A process and device to optimize the yield of fluid catalytic cracking products through a reactive stripping process are disclosed. One or more hydrocarbon streams (3) are introduced in an intermediary region of the stripper (1) of a fluid catalytic cracking unit (FCC), from a device that allows a homogeneous distribution with adequate dispersion. This/these stream(s) react(s) with the catalyst of FCC, although its activity is reduced due to the adsorption of hydrocarbons in the reaction zone, generating products that improve and/or change the global distribution of products, providing a refinery profile adequate to meet quality demands and requirements.

6 Claims, 2 Drawing Sheets

PROCESS AND DEVICE TO OPTIMIZE THE YIELD OF FLUID CATALYTIC CRACKING PRODUCTS

FIELD OF THE INVENTION

This invention relates to processes and devices to optimize the yield of fluid catalytic cracking (FCC) products. More specifically, the invention relates to processes and devices that involve the reactive stripping of a fluid catalytic cracking (FCC) unit catalyst, generating products that optimize the yield and quality of fluid catalytic cracking products.

BACKGROUND OF THE INVENTION

The continuous development of fluid catalytic cracking (FCC) technology throughout the years has been propelled by several factors. Among these factors, the desire to produce petroleum products with superior quality and the fulfillment of the consumption demands are the principal ones. However, with the evolution of the requirements of environmental departments, FCC technology has evolved in the sense of fuel production that meets the environmental standards, as the contribution of the emissions of the gasoline-fueled vehicles represents a substantial part of the total emissions of pollutant compounds released in the atmosphere of urban areas.

Moreover, the development of the new clean burning engines and the introduction of the catalytic converters in the exhaust system of vehicles, from the 1980's on, obliged the companies that produce fuels to increase the quality standards, aiming at producing gasoline with higher octane and with low pollutant content such as, for example, sulfur and nitrogen. The future fuel demand outlooks indicate a reduction in gasoline consumption and a proportional increase in liquefied petroleum gas (LPG) consumption in the Brazilian market. It will be necessary to adapt the production units to this new reality.

In view of these trends, persons skilled in FCC technology continue to search for solutions that may provide flexibility to the processes, without losing sight of the product quality obtained and at the same time meeting the demands of the market. This trend is reflected in several filed patents that aim at meeting the above-mentioned objectives.

Several patents disclose recracking techniques with the objective of increasing the octane and changing the yield of FCC products. For example, U.S. Pat. No. 5,616,237 discloses a process where the stream to be cracked is divided into fractions and injected in the reaction zone in several points along the riser. The said patent also foresees the possibility of recycling the cracked products to the riser through the injection points.

Similarly, U.S. Pat. No. 5,154,818 discloses a hydrocarbon catalytic cracking process in multiple sections. In this patent, a light hydrocarbon stream is contacted with the catalyst used in the riser section, while a heavy hydrocarbon stream is contacted with the catalyst regenerated from another section of the riser, and a part of the effluent obtained in the first section is introduced in the second section of the riser.

In the inventions disclosed by the above-mentioned patents, the cracking of the hydrocarbon streams in the riser reduces the total capacity of the FCC unit, due to the introduction of a recycling stream in the reaction zone.

The spent FCC catalyst usage for converting the hydrocarbons is also presented in U.S. Pat. No. 6,162,402. In this patent, the spent catalyst is partially recycled for the reaction zone to favor the hydrocarbon yield. This approach also reduces the total capacity of the FCC unit.

The heating of the stripper in order to make possible a higher recovery and desorption of hydrocarbon steam of the catalyst surface is also another alternative. To reach a high temperature in the stripper, it can be adopted as heat transfer tubes or direct or indirect heat transfer from the catalyst that leaves the regenerator, as per U.S. Pat. No. 5,234,578. The stripper temperature is a function of the new reaction temperature increase. Consequently, the increase of the temperature in the stripper implies increased reaction temperature and severity of the process. Thus, the temperature increase can cause a negative effect in the profile of the obtained products and increase the power consumption of the unit.

U.S. Pat. No. 6,238,548 claims the recycling of naphtha for the region of dense phase, located at the top of the stripper, with gain in the octane. The injection in this region reduces the contact between the naphtha and the catalyst, reducing the conversion and the improvement of quality of the FCC products.

In view of the above, a solution is desired that does not reduce the capacity and the unit conversion, as well as the improvement of FCC product quality. In addition, a solution is desired with the possibility of a selective cracking on the stripping vessel, in order to optimize the yield of relevant products without compromising the production in the reaction zone (riser).

SUMMARY OF THE INVENTION

The process and device to optimize the yield of the fluid catalytic cracking products, the object of this invention, aims at eliminating partially or totally the above-mentioned disadvantages, through a reactive stripping process, in which one or more hydrocarbon streams are introduced in the stripping section of a fluid catalytic cracking (FCC) unit, from a device that allows a homogeneous distribution with adequate dispersion. This/these stream(s) react(s) with the FCC catalyst in the stripper vessel, even if it is with reduced activity due to the presence of hydrocarbons from the reaction zone, generating products that optimize the yield of relevant products according to the market demands and the quality requirements.

Thus, the invention relates to a process and device to optimize the yield of selected FCC products. As discussed above, this objective is achieved through the use of reactive stripping, which involves the selective catalytic cracking of a hydrocarbon stream with spent FCC catalyst in the stripping vessel of an FCC unit. The use of the stripping vessel as a "secondary FCC reactor" does not compromise the production capacity of the reaction zone ("riser"), and the products obtained from the stripper reaction will increase the yield of a particular product.

The stripper vessel reaction takes place at the normal operational pressure and temperature of the stripper vessel. The hydrocarbon to be employed will vary according to the product yield to be optimized. For sulfur content reduction, the catalytic cracking of cracked naphtha in the stripper vessel reduces the sulfur content. As another example, an initial fraction of light cycling oil (LCO) may be used to increase the yield of light olefins.

In the process of the invention, conventional stripping takes place simultaneously with the reactive stripping. Thus, both steam and hydrocarbons are injected in the stripper vessel. An advantage of the invention is that it does not compromise conventional stripping efficiency.

BRIEF DESCRIPTION OF THE DRAWINGS

The process and device to optimize the yield of fluid catalytic cracking products, the object of this invention, shall be

DETAILED DESCRIPTION OF THE INVENTION

Figure 1:
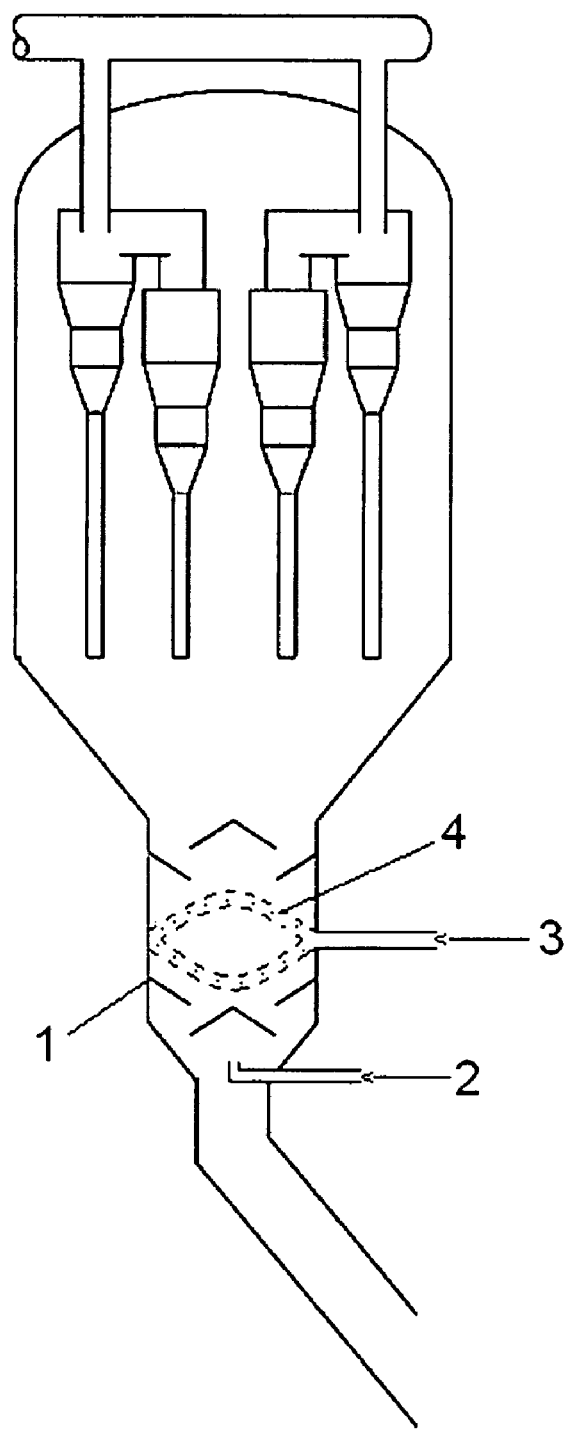
FIG. 1 shows a schematic representation of a stripping vessel, according to one of the embodiments of this invention.

The process and device to optimize the yield of fluid catalytic cracking products, the object of this invention, may be performed as per the identification of the respective components, based on the above described figures.

This invention relates to processes and devices to optimize the yield of fluid catalytic cracking (FCC) products. Specifically, the invention relates to processes and devices that involve the reactive stripping of a fluid catalytic cracking (FCC) unit catalyst generating products that optimize the yield and quality of fluid catalytic cracking products.

The stripping step of the catalyst used to remove the residue hydrocarbons has been considered, recently, to be relevant to improve the operation of the FCC unit, as the efficiency increase of the stripper reduces the coke formation in the unit, increases the recovery of products and causes a temperature decrease of the dense phase in the regenerator. With this, some improvements are found with the usage of the following:

Vertical devices that create a contact region between the catalyst and the countercurrent steam;
Structured filling in the stripper;
Flux tubes; and
Other devices replacing the traditional baffles that have been used.

The present invention can be used with any kind of stripper used in FCC units.

This invention is based on the reactive stripping concept, in which one or more hydrocarbon streams are injected in the stripping section of an FCC unit. This/these hydrocarbon stream(s) react(s) with the FCC catalyst in the stripper vessel, even if it is with reduced activity due to the adsorption of hydrocarbons in the reaction zone, generating products that optimize the yield of relevant products according to the market demands and the quality requirements.

The hydrocarbon stream to be injected depends on the objectives to be met. Suitable hydrocarbon streams include but are not limited to the following:

Cracked naphtha, if the objective is to improve the product quality, as, for example, by means of sulfur content reduction;
Initial fraction of light cycling oil (LCO), in case the objective is to increase the light olefin products yield; and
Other refinery streams from the refinery, particularly coke naphtha, schist naphtha, coke light gasoil or also streams from the lubricant production process.

According to the invention, it is possible to perform a selective cracking at the operational temperature and pressure conditions in the stripping vessel, in order to optimize the yield of relevant products without compromising the production in the reaction zone (riser), as there is no introduction of modifications in the referred reaction zone.

The stream(s) may be introduced in the stripping section, from a device that allows a homogeneous distribution with adequate dispersion. The device may be, but is not limited to, a ring shaped steam distributor or a distributor similar to a steam pipe grid.

The steam and hydrocarbon streams are introduced in the stripper simultaneously by the injection of steam at the bottom of the stripping vessel, while the hydrocarbon stream is injected at a point in the stripping vessel at a particular distance from the bottom of the vessel. By way of example, a steam ring may be employed at the bottom of the stripper and an intermediate ring through which the hydrocarbon stream is injected may be employed at an intermediate height of the vessel. The said steam flow is encompassed in a range between 2% and 10% by weight of the hydrocarbon stream introduced in the stripper equipment.

The injection point of the streams is dependent upon the stripping vessel characteristics. However, if the injection point is too close of the stripper vessel bottom, a substantial fraction of the stream goes to the regenerator and, consequently, is burnt in this phase. On the other hand, if the injection point is too close of the stripper vessel top, there is a decrease in contact time between the stream and the catalyst. In both cases, the selective cracking efficiency is considerably reduced. Thus, considering the total height of the stripper to be the distance between the bottom and the top of the stripper vessel, the stream may be injected at a height within a value range between 33% and 66% of the total height of the stripper, preferably from 45% to 60% of the total height of the stripper. The definitive selection of the hydrocarbon injection point depends also on the products to be optimized in terms of yield and improvement of the product quality.

The hydrocarbon fraction to be injected in the stripper may also be optimized. This way, the hydrocarbon fraction to be injected in the stripper may be encompassed in a range between 1% and 20% by weight of the total capacity of the FCC unit, preferably, in a range encompassed between 5% and 15% by weight of the total capacity of the FCC unit.

The catalyst used can be of any known formulation in the FCC art, in the presence or not of functional additives such as, for example, additives based on ZSM-5.

FIG. 1 shows one embodiment of the equipment, according to the invention. The figure shows schematically a stripper (1), where the steam is injected close to its bottom, by means of a steam injection point (2). In the intermediate region, a hydrocarbon stream (3) is injected by a ring shaped stream distributor (4), with the objective of improving the yield and the quality of the FCC products. This way, the contact time between the hydrocarbon stream (3) and the catalyst propelled by the steam stream (2) is optimized, which facilitates the reaction between the hydrocarbon stream (3) and the catalyst, which, at this moment of the global process, is in reduced activity due to the presence of adsorbed hydrocarbon. The reactions that occur at the operational temperature and pressure of the stripping vessel favor the formation of products that improve the global conversion and the product quality. Thus, the obtained products meet the environmental standards.

Figure 2:
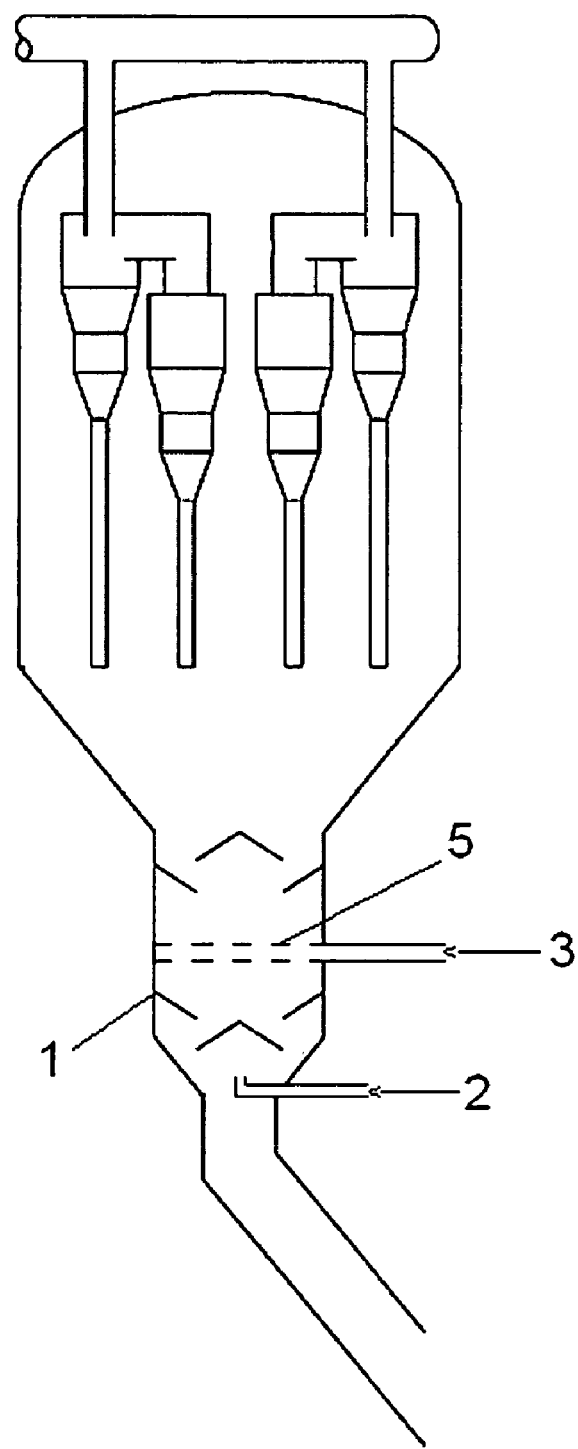
FIG. 2 shows a schematic representation of a stripping vessel, according to another embodiment of this invention.

FIG. 2 shows another embodiment of the equipment, according to the invention. The figure shows schematically a stripper (1), where the steam is injected close to its bottom, by means of a steam injection point (2). In the intermediate region, a hydrocarbon stream (3) is injected by a pipe grid (5) with the objective of improving the yield and the quality of the FCC products. This way, the contact time between the hydrocarbon stream (3) and the catalyst propelled by the steam stream (2) is optimized, which facilitates the reaction between the hydrocarbon stream (3) and the catalyst, which, at this moment of the global process, is in reduced activity due to the presence of adsorbed hydrocarbon. The reactions that occur at the operational temperature and pressure conditions of the stripping vessel favor the formation of products that improve the global conversion and the product quality. Thus, the obtained products meet the environmental standards.

EXAMPLE

Gasoline obtained by an FCC process was reprocessed both in a lab FCC unit and in an FCC pilot unit, with clean catalyst, simulating the effect of recycling the gasoline in the riser segregated in the sulfur content and in other quality parameters, such as olefins, stability and octane. The results of the two units show a 40% reduction in the total sulfur, achieved primarily by the removal of the alkylthiophens, compounds typically found in the light fraction of naphtha. In addition, a substantial reduction of benzothiophen, characteristic of the heavy naphtha, was also obtained. The olefins content was reduced 40%. Dienes were almost zero, indicating a significant improvement of stability, and there was also a one-point gain in the RON (Research Octane Number) and four points in the MON (Motor Octane Number). Depending on the severity of conditions such as, for example, the riser temperature, there is a loss in gasoline yield that ranges between 25% and 30%, producing 16.5% of LPG, 3.2% of coke, 3.9% of combustible gas and 6.5% of light oil from recycling in the pilot unit.

The process and device description presented so far to optimize the yield of the fluid catalytic cracking products, the object of this invention, may be considered only as a possible embodiment or embodiments, and any particular characteristics introduced in it may be understood only as something described to facilitate the understanding. This way, they cannot, in any way, be considered as limiting the invention, which is limited by the scope of the claims below.

The invention claimed is:

1. A process to optimize the yield of fluid catalytic cracking products, wherein the injection of one or more hydrocarbon streams (3) is made in a stripper (1) at a height in a range between 33% and 66% of the total height of the stripper (1), simultaneously with a steam injection (2) in the bottom of the stripper, said steam injection being in a range of 2% to 10% by weight of the hydrocarbon streams.

2. The process to optimize the yield of fluid catalytic cracking products according to claim 1, wherein said hydrocarbon streams are selected from the group consisting of cracked naphtha, an initial fraction of light cycling oil, coke naphtha, schist naphtha, and coke light gasoil.

3. The process to optimize the yield of fluid catalytic cracking products according to claim 1 or 2, wherein said hydrocarbon streams are injected in the stripper (1) with at least one device that disperses and provides a homogeneous distribution of the one or more hydrocarbon streams (3), said device being selected from the group consisting of one or more ring-shaped steam distributors and one or more steam pipe grids.

4. The process to optimize the yield of fluid catalytic cracking products according to claim 1, wherein at least one injection point of the hydrocarbon stream (3) is at a height in a range between 45% and 60% of the total height of the stripper (1).

5. The process to optimize the yield of fluid catalytic cracking products according to claim 1, wherein the total fraction of said hydrocarbon stream (3) to be injected is in a range between 1% and 20% by weight of the total hydrocarbon capacity of the FCC unit.

6. The process to optimize the yield of fluid catalytic cracking products according to claim 1, wherein the total fraction of said hydrocarbon stream (3) to be injected is in a range between 5% and 15% by weight of the total capacity of the FCC unit.

* * * * *